United States Patent
Ruhe et al.

(10) Patent No.: US 12,268,214 B2
(45) Date of Patent: Apr. 8, 2025

(54) SHEETER WITH LATERALLY MOVEABLE DISCHARGE CONVEYOR

(71) Applicant: J.C. Ford Company, La Habra, CA (US)

(72) Inventors: Scott D. Ruhe, Yorba Linda, CA (US); Steven King, Taylorsville, UT (US); Jason Pealo, Yorba Linda, CA (US); Paul Winocur, Lake Forest, CA (US)

(73) Assignee: J.C. Ford Company, Columbia, TN (US)

( * ) Notice: Subject to any disclaimer, the term of this patent is extended or adjusted under 35 U.S.C. 154(b) by 728 days.

(21) Appl. No.: 17/520,512

(22) Filed: Nov. 5, 2021

(65) Prior Publication Data

US 2023/0145450 A1    May 11, 2023

(51) Int. Cl.
*A21C 9/08* (2006.01)
*A21C 3/02* (2006.01)

(52) U.S. Cl.
CPC . *A21C 9/08* (2013.01); *A21C 3/02* (2013.01)

(58) Field of Classification Search
None
See application file for complete search history.

(56) References Cited

U.S. PATENT DOCUMENTS

| | | | |
|---|---|---|---|
| 11,406,108 B1 * | 8/2022 | Alatorre | A21C 11/10 |
| 2011/0111100 A1 * | 5/2011 | Ebata | A21C 9/08 426/231 |

* cited by examiner

*Primary Examiner* — Jacob T Minskey
*Assistant Examiner* — Adrien J Bernard
(74) *Attorney, Agent, or Firm* — Knobbe, Martens, Olson & Bear, LLP

(57) ABSTRACT

A sheeter can include a discharge conveyor mounted to be laterally translatable so as to allow a user to stand close to the discharge side of the dough sheeter and access those components. The discharge conveyor can be mounted to a guide assembly configured to accommodate lateral movement of the discharge conveyor. The guide assembly can include nesting, primary and secondary guide assemblies.

25 Claims, 15 Drawing Sheets

SHEETER WITH LATERALLY MOVEABLE DISCHARGE CONVEYOR

BACKGROUND OF THE INVENTIONS

Field of the Inventions

The present inventions relate to improvements in high speed production sheeting devices for comestible products (e.g., tortillas and tortilla chips). More specifically, the present inventions relate to sheeting devices with moveable discharge conveyor.

Description of the Related Art

Corn tortillas and tortilla chips are cut from a sheet of corn dough, called "masa," and then baked and/or fried. In mass production, the sheeting and cutting stages are accomplished by a tortilla sheeter.

High production tortilla sheeters feed masa from a hopper between a pair of large, stainless steel rollers which roll the masa into a sheet of substantially uniform thickness. The rollers are spaced apart in production to form a gap, known as a "pinch point gap," through which the masa passes. The masa adheres to the surface of one of the rollers, known as the exit roller, after passing through the pinch point gap. A third roller then cuts the masa into either tortillas or tortilla chips. The third roller, known as the cutting roller, commonly has either circular shaped (for tortillas) or triangular-shaped (for tortilla chips) cutting guides positioned on the cylindrical external surface of the cutting roller. The cut tortillas or chips then are stripped from the exit roller by a stripper wire and/or a blower, or by a similar device.

A discharge conveyor assembly with a powered conveyor is positioned downstream from the cutting roller. The cut tortillas or chips fall onto the conveyor belt of the discharge conveyor. In order to ensure optimal payout of the cut pieces of dough onto the conveyor, the conveyor belt of the discharge conveyor is disposed partly under the cutting roller and runs at a speed approximately equal to the speed of the outer surface of the cutting roller. The discharge end of the discharge conveyor is disposed vertically above a downstream conveyor which can be used, for example, to feed tortillas into an oven.

SUMMARY OF THE INVENTIONS

An aspect of at least one of the inventions disclosed herein includes the realization that certain routine maintenance procedures employed for operating a dough sheeter includes the need to access components on the downstream side of the sheeter. For example, changing or repairing a stripper wire or accessing the cutting or other rollers. Conventional dough sheeters have a discharge conveyor assembly that is fixed to the discharge end of the sheeter. An aspect of at least one of the inventions disclosed herein includes the realization that the discharge conveyor can be mounted to be laterally translatable so as to allow a user to stand close to the discharge side of the dough sheeter and access those components.

Additionally, such a laterally movable discharge conveyor can also improve access to downstream components, such as a transfer conveyor or conveyor for feeding dough into an oven. By including a guide mechanism for moving the discharge conveyor assembly laterally relative to the sheeter, workers can also access downstream devices as well as the downstream end of the discharge conveyor, for performing maintenance procedures.

Thus, in accordance with some embodiments a dough sheeting device can comprise a support frame, a discharge conveyor assembly comprising a conveyor frame and a conveyor belt, the discharge conveyor assembly having an intake end, a discharge end, and a central portion between the intake and discharge ends, and a guide assembly supporting the discharge conveyor assembly for movement between a deployed position aligned with the support frame and a retracted position laterally offset from the deployed position.

In accordance with other embodiments, a dough sheeting device can comprise a support frame, a rear roller having a first outer surface and supported by the support frame to rotate about a first axis, a front roller having a second outer surface and supported by the support frame to rotate about a second axis spaced from the first axis such that juxtaposed portions of the first and second outer surfaces define a pinch point gap, a cutter roller having an outer cutting surface and supported by the support frame to rotate about a third axis spaced from the second axis such that the outer cutting surface and the second outer surface are sufficiently close to cut dough, a discharge conveyor assembly comprising a conveyor frame, a plurality of rollers supported by the conveyor frame, a drive roller, a drive motor connected to the drive roller and configured to rotate the drive roller, a conveyor belt wrapped around the plurality of rollers and the drive roller, the discharge conveyor assembly having an intake end, a discharge end, and a central portion between the intake and discharge ends, a guide assembly supporting the discharge conveyor assembly for movement between a deployed position and a retracted position. The guide assembly can comprise a base pedestal fixed to the support frame, a primary linear guide assembly comprising a plurality of primary carriage assemblies fixed to the base pedestal, first and second primary guide rails slidingly engaged with the plurality of primary carriage assemblies, and a primary guide frame supported by the first and second primary guide rails, a secondary linear guide assembly comprising a plurality of secondary carriage assemblies fixed to the primary guide frame, first and second secondary guide rails slidingly engaged with the plurality of secondary carriage assemblies, the first and second secondary guide rails supporting the discharge conveyor assembly, wherein the primary and secondary linear guide assemblies are configured to nest with each other when in the retracted position so as to support the discharge conveyor assembly in a position fully offset from the front roller and to extend in a telescoping manner when in the deployed position so as to support the discharge conveyor assembly in a position aligned with the front roller.

In accordance with yet additional embodiments, a dough sheeting device can comprise a support frame, a rear roller having a first outer surface and supported by the support frame to rotate about a first axis, a front roller having a second outer surface and supported by the support frame to rotate about a second axis spaced from the first axis such that juxtaposed portions of the first and second outer surfaces define a pinch point gap, a cutter roller having an outer cutting surface and supported by the support frame to rotate about a third axis spaced from the second axis such that the outer cutting surface and the second outer surface are sufficiently close to cut dough, a discharge conveyor assembly comprising a conveyor frame, a plurality of rollers supported by the conveyor frame, a conveyor belt wrapped around the plurality of rollers, the discharge conveyor assembly having an intake end, a discharge end, and a central portion between the intake and discharge ends, a guide assembly supporting the discharge conveyor assembly for movement between a deployed position and a retracted position. The guide assembly can comprise a base fixed to the support frame, a primary linear guide assembly supported on the base and configured to slide laterally relative to the support frame, a secondary linear guide assembly supported on and configured to slide laterally relative to the primary linear guide assembly, the discharge conveyor assembly being supported on the secondary linear guide assembly, wherein the primary and secondary linear guide assemblies are configured to nest with each other when in the retracted position so as to support the discharge conveyor assembly in a position fully offset from the front roller and to extend in a telescoping manner when in the deployed position so as to support the discharge conveyor assembly in a position aligned with the front roller.

In accordance with yet additional embodiments, a dough sheeting device can comprise a support frame, a discharge conveyor assembly comprising a conveyor frame and a conveyor belt, the discharge conveyor assembly having an intake end, a discharge end, and a central portion between the intake and discharge ends, and a guide assembly supporting the discharge conveyor assembly for movement between a deployed position aligned with the support frame and a retracted position laterally offset from the deployed position.

BRIEF DESCRIPTION OF THE DRAWINGS

The above-mentioned and other features of the inventions disclosed herein are described below with reference to the following drawings. The illustrated embodiments of the sheeter are intended to illustrate, but not to limit, the inventions.

DETAILED DESCRIPTION OF THE PREFERRED EMBODIMENT

The inventions disclosed herein have applicability to sheeters used in conjunction with continuously moving conveyor systems. However, an understanding of the inventions disclosed herein is facilitated with the following description of the application of the principles of the present inventions to dough rolling, and in particular, rolling dough into tortillas and tortilla chips. In some embodiments, the inventions disclosed herein can be used in conjunction with sheeters that have a sheet thickness control system, such as those disclosed in U.S. Pat. Nos. 5,470,599, and 8,740,602, the entire contests of both of which are hereby incorporated by reference.

Figure 1:
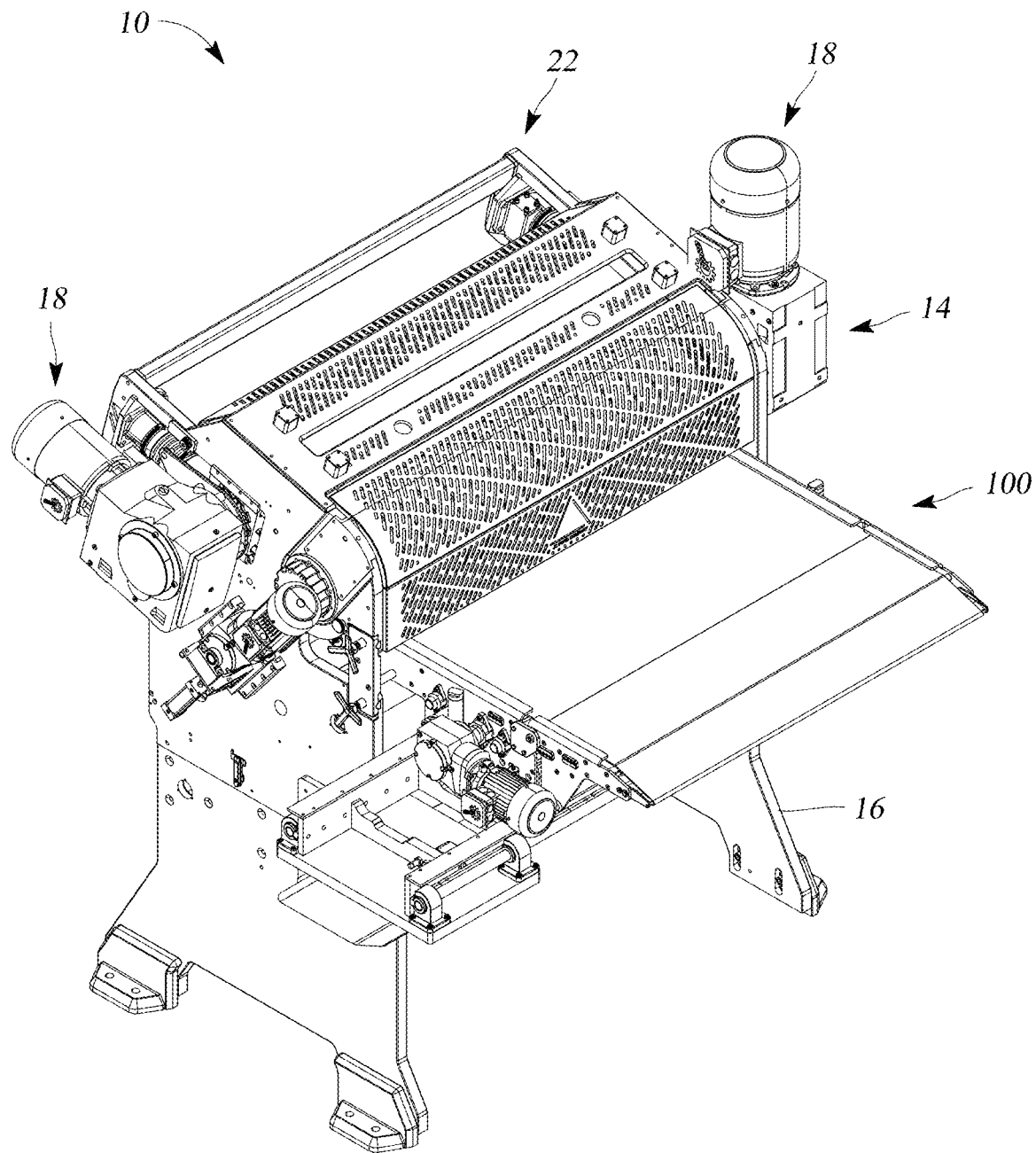
FIG. 1 is a top, front, and right-side perspective view of an embodiment of a sheeter with the discharge conveyor assembly in the deployed position.

FIG. 1 illustrates a tortilla sheeter 10 having a laterally moveable discharge conveyor 100. The tortilla sheeter 10 is in the configuration for tortilla chip production, and can include various types of electronic thickness control, pinch point gap control, and other related systems and functionality. The inventions disclosed herein have applicability to a variety of different types of food rolling machines and sheeters, however, tortilla sheeters, such as the sheeter 10 the basic understanding of which provides useful context for appreciation of the inventions disclosed herein.

With continued reference to FIG. 1, the sheeter 10 includes a roller assembly 14 and a support frame assembly 16. The support frame assembly 16 is in the form of a housing which can include and support various types of devices for operations of the sheeter 10. The roller drive assembly can include electric motors 18 and an appropriate gear reduction mechanism for driving a shaft of one or both of the rollers. The roller assembly 14 is attached to the support assembly 16. Additionally, a hopper assembly 22 is supported above the rollers of the roller assembly 14.

The roller drive assembly 14 also includes a generally cylindrical front roller 24 and a generally cylindrical rear roller 26. The rollers 24, 26 can have a slightly roughened surface (obtained, for example, with sandblasting). The rollers 24, 26 are rotated in opposite directions and can be driven at the same speed or slightly different speeds, depending on desired performance characteristics. The rollers 24, 26 are positioned generally parallel to each other.

Figure 4:
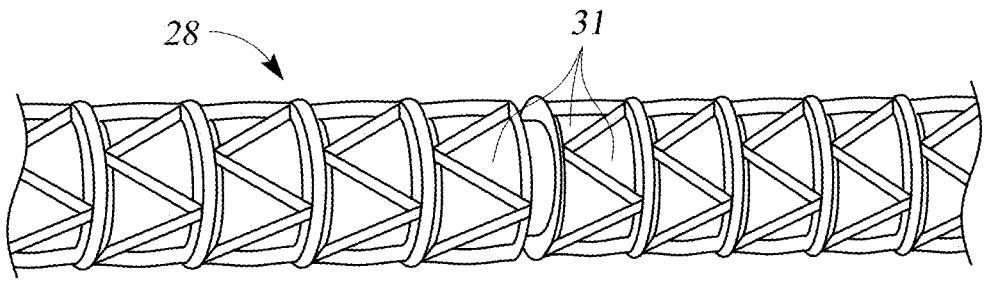
FIG. 4 is a cutting roller that can be incorporated into the dough sheeter of FIG. 1.

With reference to FIG. 4, the roller assembly 14 can also include a cutting roller 28. The cutting roller 28 is in the form of a cutting roller designed for tortilla chip manufacturing, and thus includes triangular-shaped recesses and edges for cutting triangular pieces of dough. The cutting roller 28 is also mounted within the roller drive 14.

Figure 5:
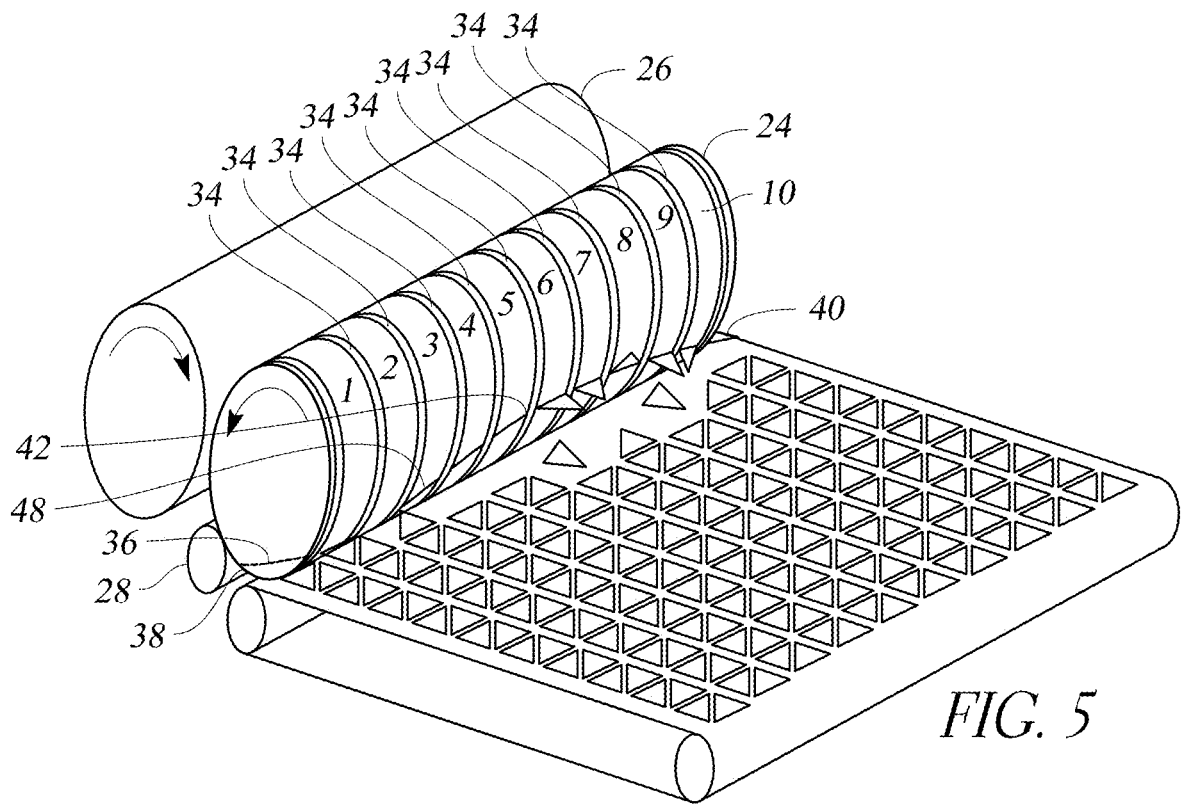
FIG. 5 is a schematic representation of a front, rear, and cutter roller within the sheeter of FIG. 1.
Figure 6:
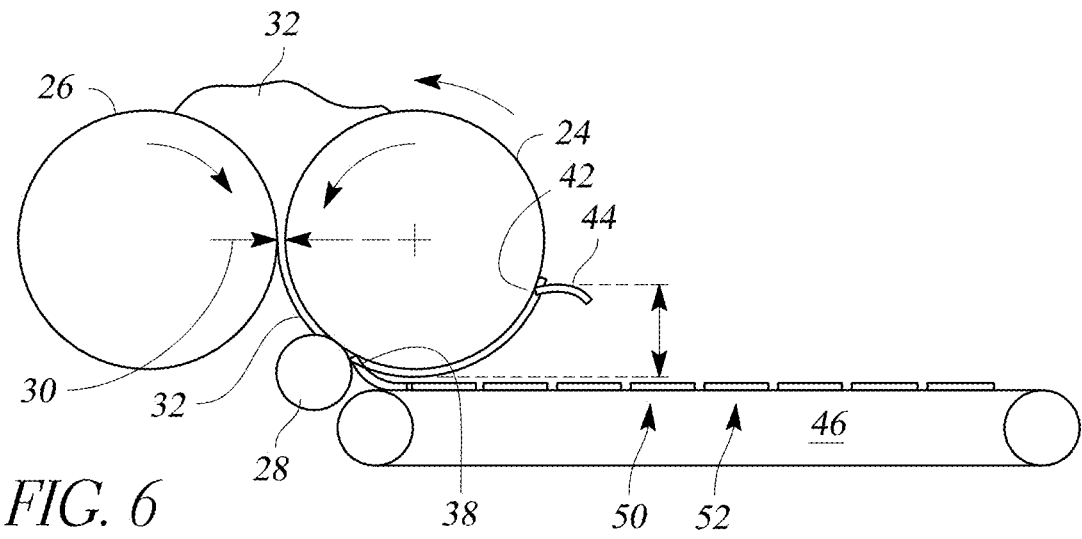
FIG. 6 is a schematic side elevational view of the roller arrangement of FIG. 5 illustrating an operation of a stripper wire illustrated in FIG. 5.

With reference to FIGS. 5 and 6, the rollers 24, 26 are mounted parallel to each other to define a pinch point gap 30.

The hopper (FIG. 1) is mounted above the rollers 24, 26 so as to support dough, such as masa 32 above the pinch point gap 30. As such, as the rollers 24, 26 are driven in counter-rotating directions, the masa 32 is pulled into the pinch point gap 30. A thin layer of dough 32 is discharged form the pinch point gap and adhered to an outer surface of the roller 24. As the sheet of dough 32 moves counter-clockwise along with the roller 24 (as viewed in FIG. 5), it is passed between the cutting roller 28 and the outer surface of the front roller 24. The cutting roller 28 cuts the dough sheet 32 into desired shapes. In the illustrated prior art device, the dough is cut into triangular shaped pieces of dough for making tortilla chips. Other types of cutting rollers can also be used.

The front roller 24 also includes a plurality of grooves, in which bands 34 are disposed. The grooves have an inner surface that has a smaller diameter than the inner surface of the bands 34. The bands are sufficiently large that they can be pulled approximately parallel or slightly projecting from the outer surface of the roller 24.

A stripper wire 36 is secured to the roller assembly 14 at locations adjacent to both ends of the front roller 24 and downstream from the cutter roller 28. More specifically, the stripper wire 36 is mounted at the right end of the front roller 24 adjacent to the right-most point of contact 38 and secured at the left end of the roller 24 adjacent to the left-most point of contact 40. The stripper wire is threaded under the bands 34. As such, the stripper wire can strip off cut pieces of dough from the outer surface of the front roller 24 yet allow remaining pieces of dough, referred to as "rework", to remain in contact with the bands 34 and be fed back into the hopper so as to become reworked with the dough 32 above the pinch point gap (FIG. 6).

With reference to FIG. 4, during operation, the rotation of the roller 24 (counter-clockwise in FIGS. 4 and 5) and the resulting friction between the stripper wire 36 and the outer surface of the roller 24 and the bands 34 (which rotate with the roller 24) causes the stripper wire 36 to be pulled in the counterclockwise direction. As such, the stripper wire tends to follow an arched shape around the front roller 24. For example, as shown in FIG. 4, the right-most point of contact 38 of the stripper wire 36 and the outer surface of the front roller 24 is close to the cutter roller 28. However, towards the center of the front roller 24, the stripper wire 36 is pulled up to an apex 42 which is at the highest point of contact 42 between the stripper wire 36 and the outer surface of the roller 24. The stripper wire 36 can break, which requires a user to access the space at the discharge side of the front roller 24 and the stripper wire mount points for appropriate repairs.

With continued reference to FIGS. 4 and 5, the difference in height between the right-most contact point 38 and the apex 42 causes individually cut pieces of dough 44 to be separated and fall away from the outer surface of the front roller 24 at different heights. For example, triangular pieces of dough discharge from the front roller 24 near the contact point 36 are dropped immediately down onto an output conveyor assembly 100. At an intermediate contact point 48 between the contact points 36 and 42, the cut pieces of dough fall a distance 50 from the outer surface of the roller to the output conveyor 46. Further, at or near the contact point 42, the cut pieces of dough fall a greater distance 52 which is much greater than the distance 50, onto the output conveyor 100. The higher the contact point 42, the larger the distance 52.

As noted above with reference to FIGS. 1 and 2, the discharge conveyor 100 is laterally moveable between a deployed position (FIG. 1) and a retracted position (FIG. 2).

Figure 7:
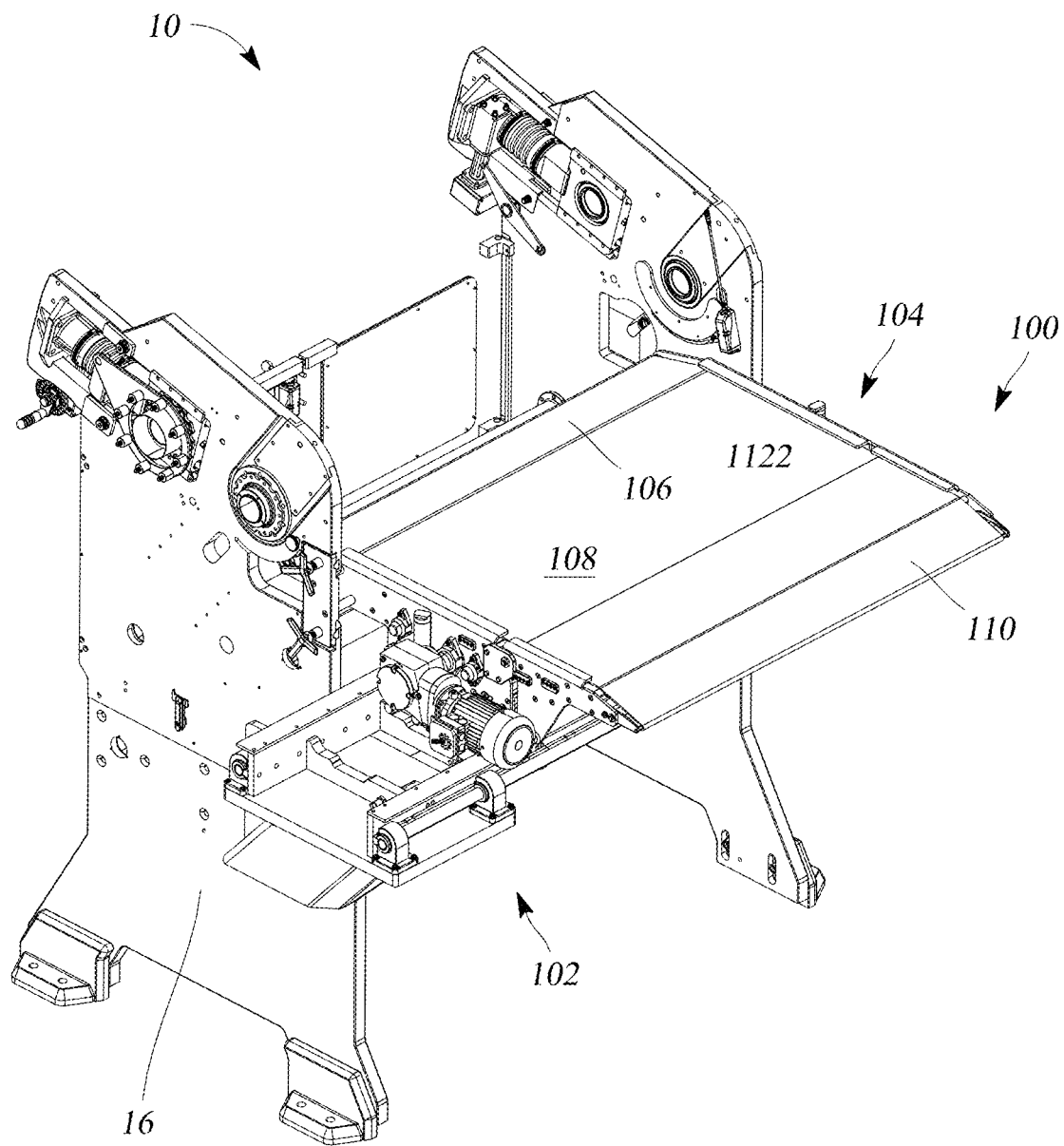
FIG. 7 is a top, front, and right-side perspective view of the embodiment of FIG. 1, with certain components removed.
Figure 8:
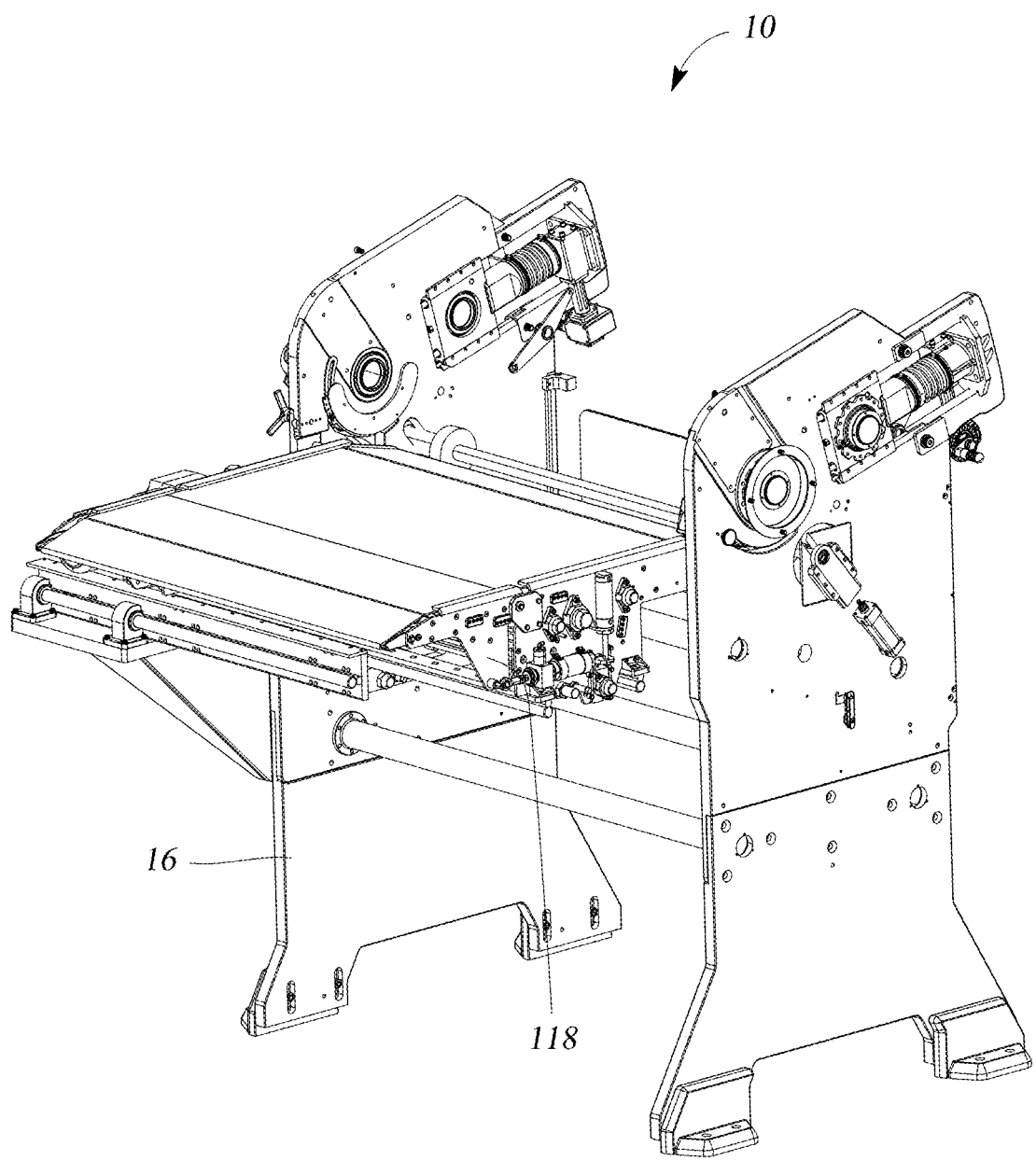
FIG. 8 is a top, front, and left-side perspective view of the embodiment of FIG. 7, with certain components removed.
Figure 9:
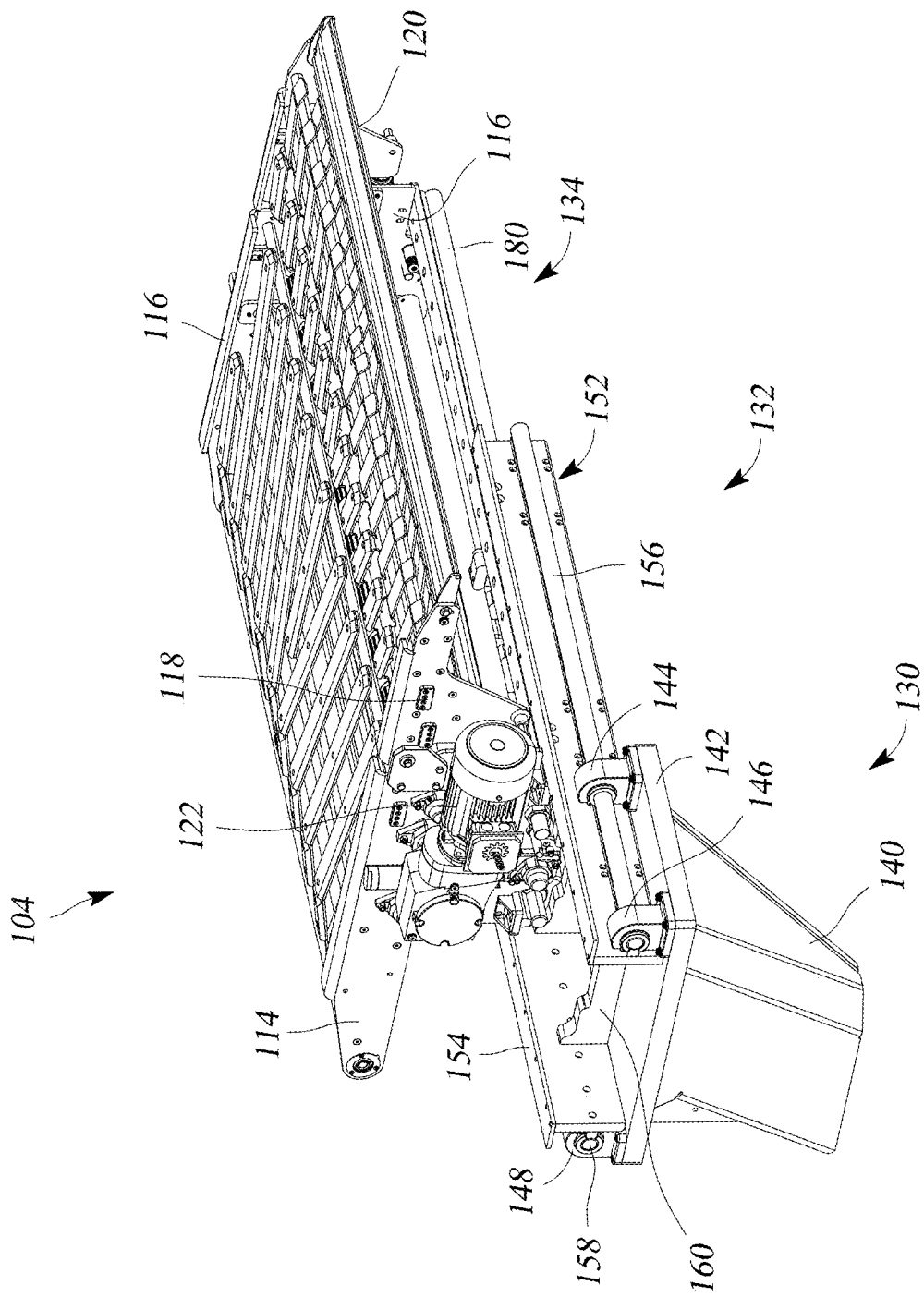
FIG. 9 is an enlarged perspective view of the discharge conveyor assembly of the embodiment of FIG. 1.

With reference to FIGS. 7-9, the discharge conveyor assembly 100 can include a guide assembly 102 supporting the discharge conveyor assembly 104 for lateral movement. The discharge conveyor assembly 104 can include an intake end 106, a middle guide portion 108, and a discharge end portion 110. In FIG. 7, the front roller 24 has been removed, revealing that the intake end 106 is normally disposed below at least a portion of the front roller 24 during use, thereby ensuring that cut pieces of dough fall onto the intake end 106 of the conveyor assembly 104.

The conveyor assembly 104 includes a frame and a plurality of roller guides and a drive roller for driving a conveyor belt 112 during operation. For example, the conveyor assembly 104 can include a right side framing member 114 and a left side frame assembly 116. Additionally, the right and left side frame assemblies 114, 116 can include pivotable portions 118, 120, respectively configured to allow the discharge end 110 to be adjusted upward or downward. A drive motor 122 can be mounted to the right side frame assembly 114 and connected to a drive roller (not shown) engaged with the conveyor belt 112 for driving the conveyor belt in the desired direction and speed.

Figure 2:
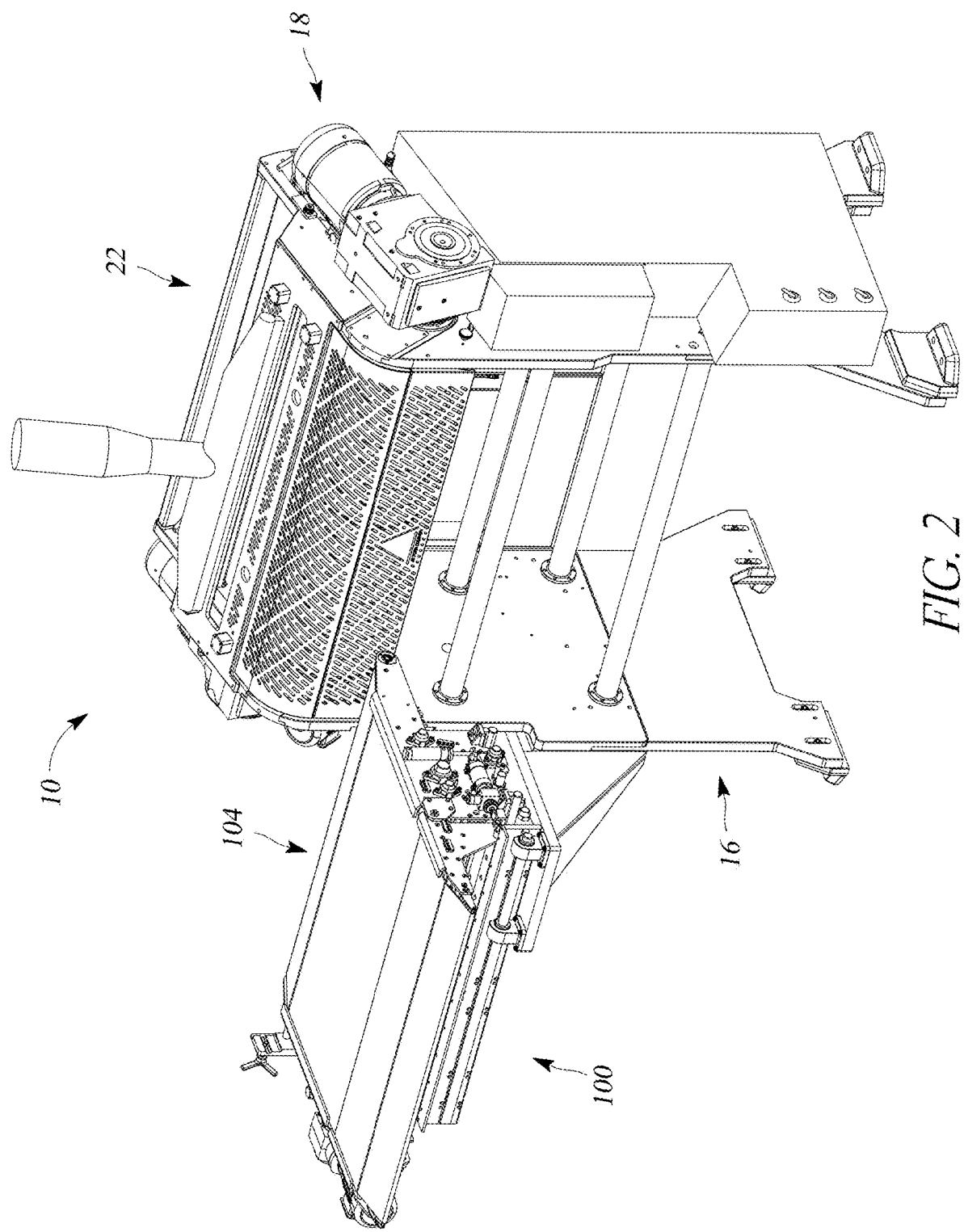
FIG. 2 is a top, front, and left-side perspective view of the sheeter of FIG. 1, with the discharge conveyor in the retracted position.

The guide assembly 102 can be configured to allow the conveyor assembly 104 to be translated or moved between the deployed position (FIG. 1) and the retracted position (FIG. 2). In the illustrated embodiment, the guide assembly 102 includes a pedestal portion 130, a primary slide assembly 132 and a secondary slide assembly 134.

The pedestal portion 130 can include a strut portion 140 and an upper base plate 142. The strut portion 140 can be attached directly to the frame 16 of the sheeter 10. As such, the positioning of the discharge conveyor assembly 104 can be positively registered with the support frame 16 and thus with all the components of the sheeter 10.

Figure 13:
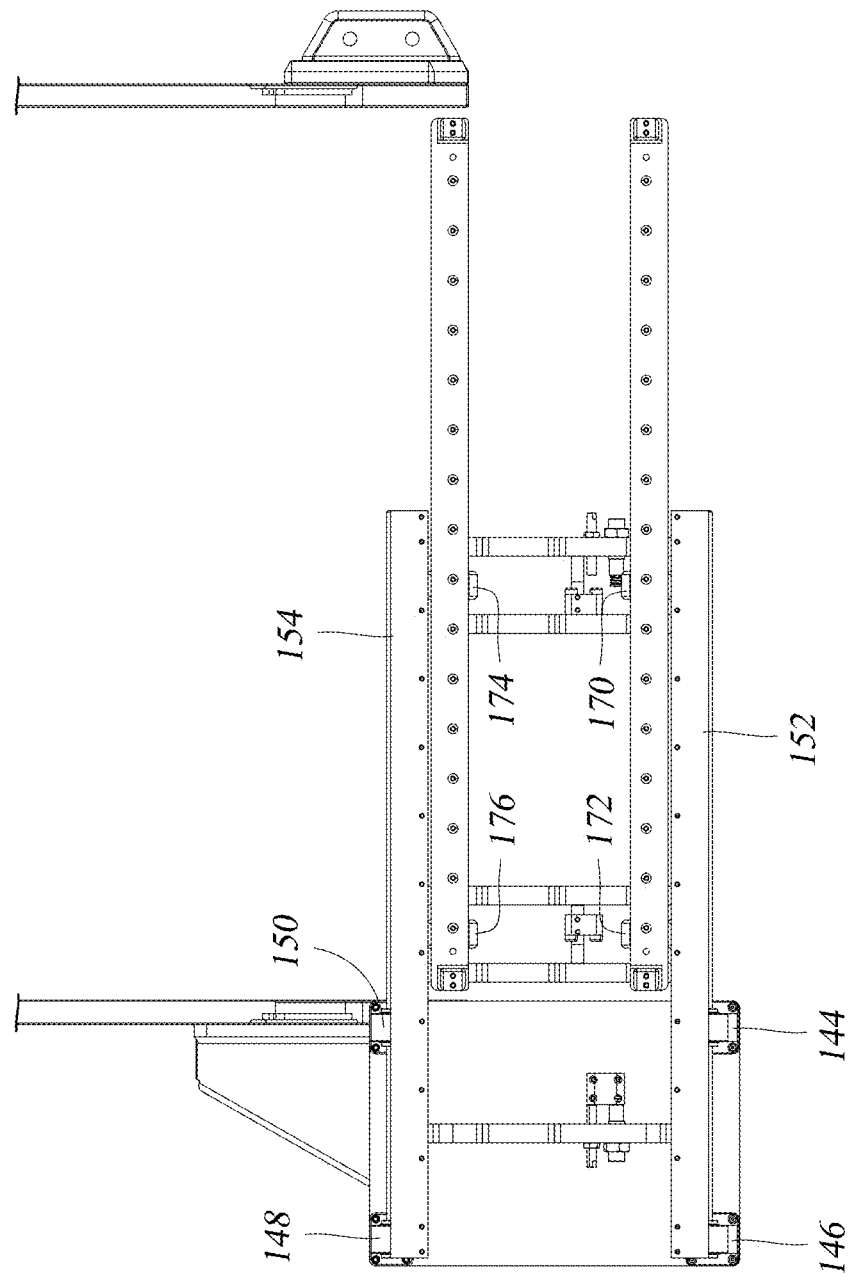
FIG. 13 is a top plan view of a guide mechanism that can be used for the embodiment of FIG. 1.

The primary guide portion 132 can include an arrangement of rails and carriages forming a linear guide assembly. In the illustrated embodiment, four carriages assemblies 144, 146, 148, 150 (FIG. 13) are mounted to the base plate 142. The carriage assemblies 144, 146, 148, 150 can be commercially available carriage assemblies including an open bore carriage housing and an open bore carriage member such as those used in commercially available linear guide systems.

The primary guide portion 132 also includes a front side primary frame member 152 and a rear primary frame member 154. A front side linear guide 156 is rigidly fixed to the front primary frame member 152. Additionally, a rear side primary guide member 158 is rigidly fixed to the rear primary frame member 154. Additionally, the carriage assemblies 144, 146 are slidably engaged with the front side guide member 156 and the carriage assemblies 148, 150 are slidably engaged with the rear side primary linear guide member 158. As such, the front and rear side primary frame members 156, 158 can slide or translate laterally, left and right, relative to the pedestal portion 130.

Figure 10:
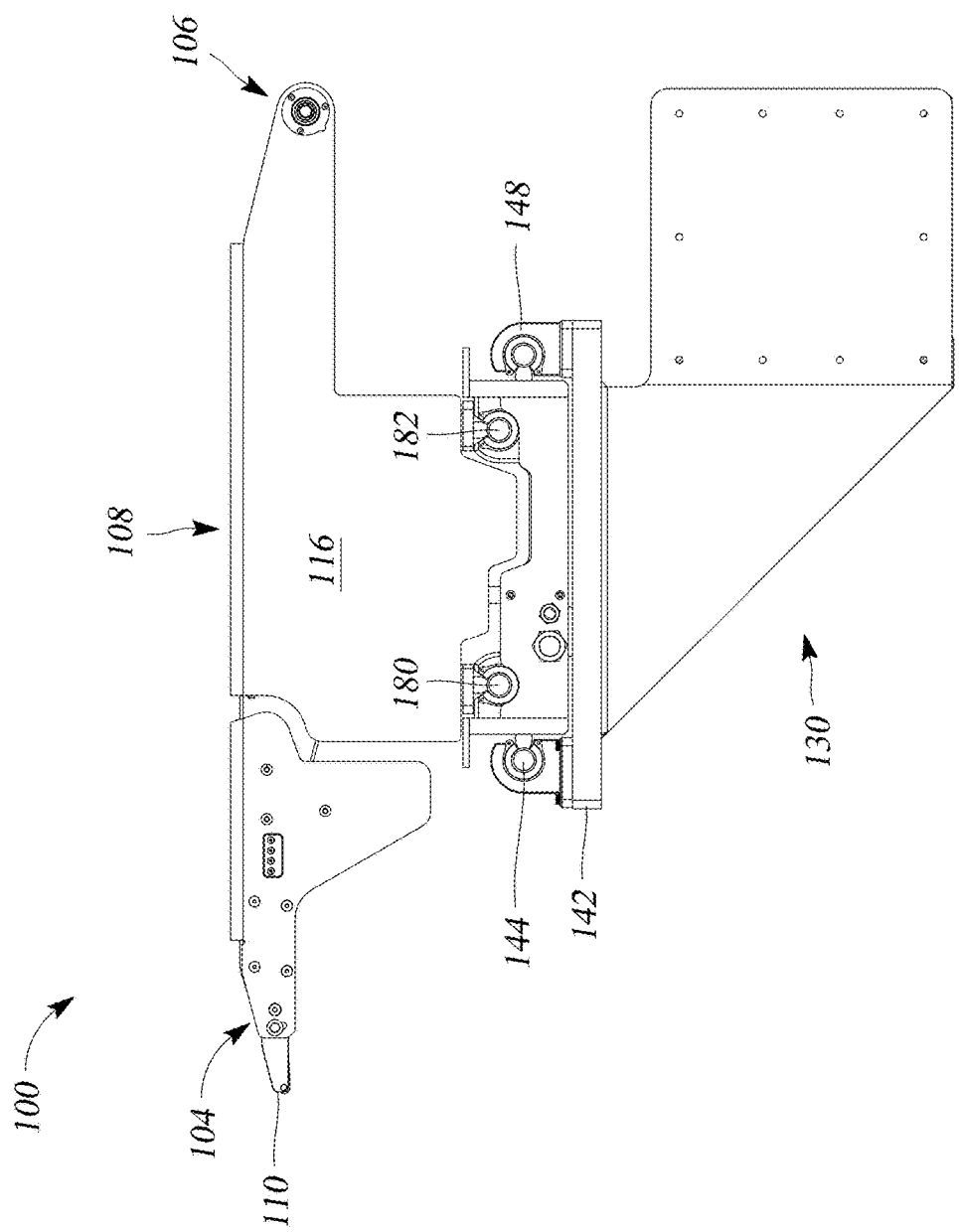
FIG. 10 is left side elevational view of the discharge conveyor assembly of the embodiment of FIG. 1.
Figure 11:
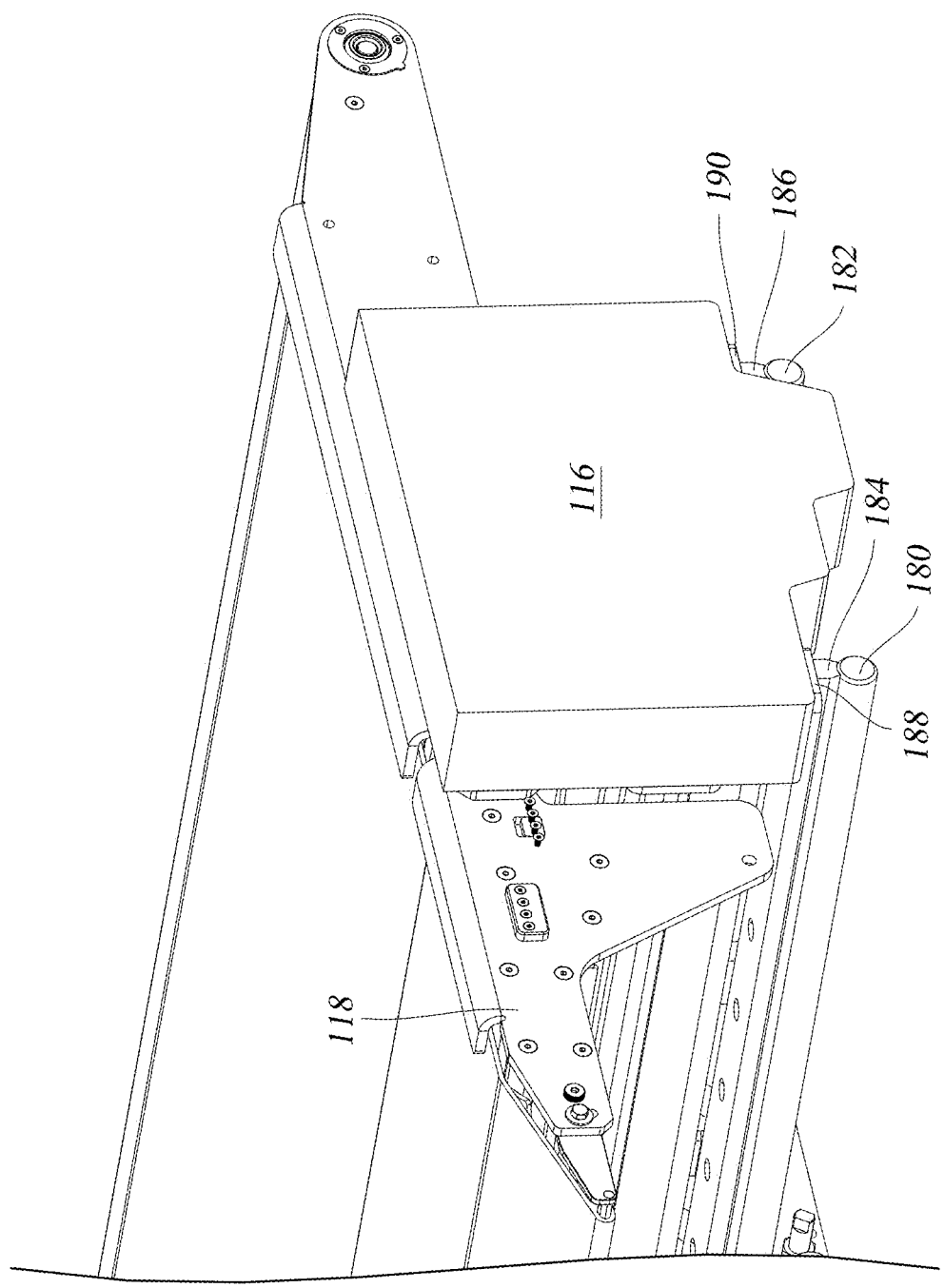
FIG. 11 is an enlarged perspective view of the discharge conveyor assembly of the embodiment of FIG. 1.
Figure 12:
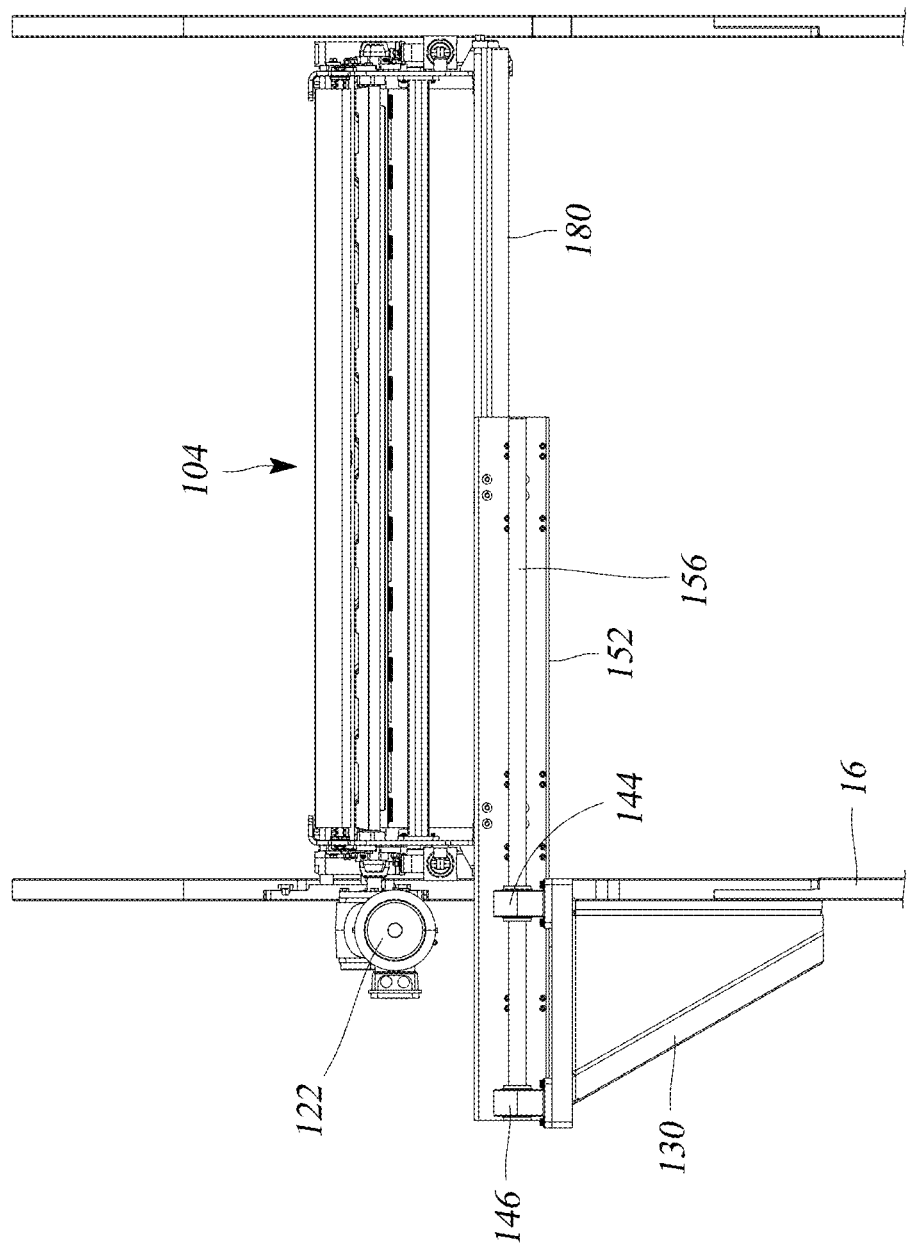
FIG. 12 is a front elevational view of the discharge conveyor assembly with gear 1, with additional components removed.

With reference to FIG. 9, a plurality of cross members 160 extend between and rigidly connect the front primary frame member 152 to the rear primary frame member 154. Additionally, with reference to FIGS. 10 and 13, a plurality of secondary carriage assemblies are fixed to the front and rear primary frame members 152, 154. For example, carriage assemblies 170, 172 are fixed to the front side primary frame member 152 and carriage assemblies 174, 176 are fixed to the rear side primary frame member 152 and carriage assemblies 174, 176 are fixed to the rear side primary frame member 154.

The frame members 114 and 116 are mounted to front and rear side secondary guiderails 180, 182. In the illustrated embodiments, the front and rear secondary guiderails 180, 182 are secured to spacer members 184, 186 and upper support members 188, 190. The frame members 114, 116 are secured to the support members 188, 190.

Figure 14:
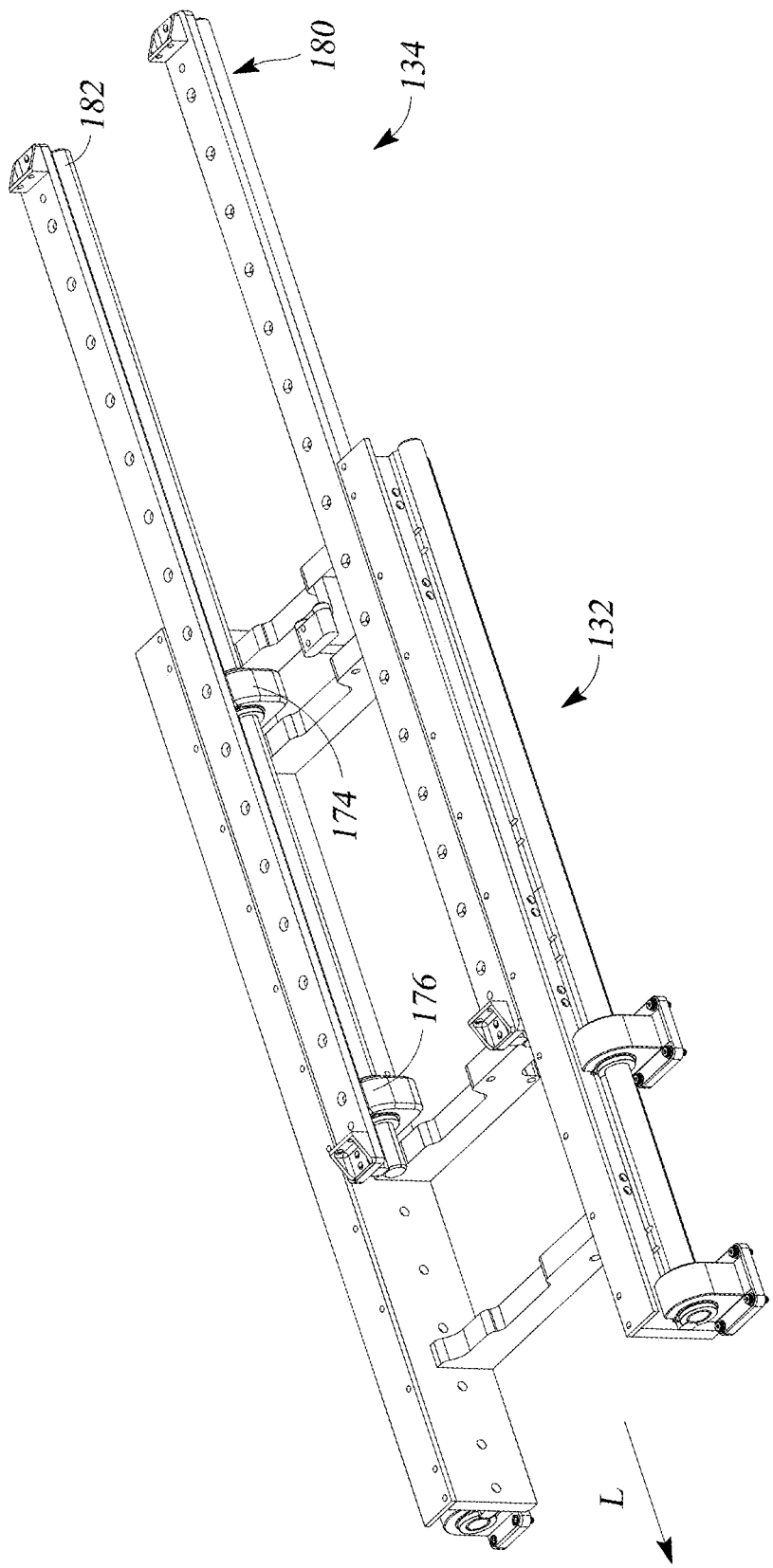
FIG. 14 is a front, top, and right-side perspective view of the guide mechanism in the deployed position.
Figure 15:
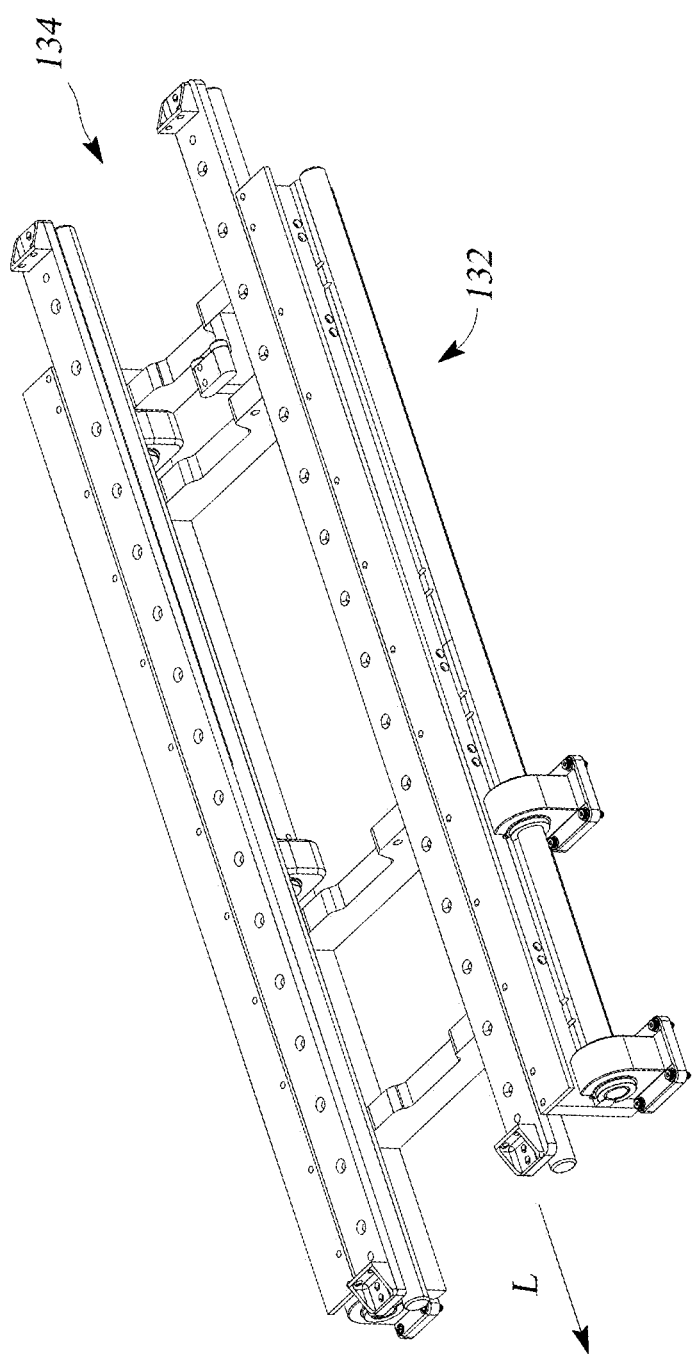
FIG. 15 is a top, front, and right-side perspective view of the guide mechanism of FIG. 14, in an intermediate position.
Figure 16:
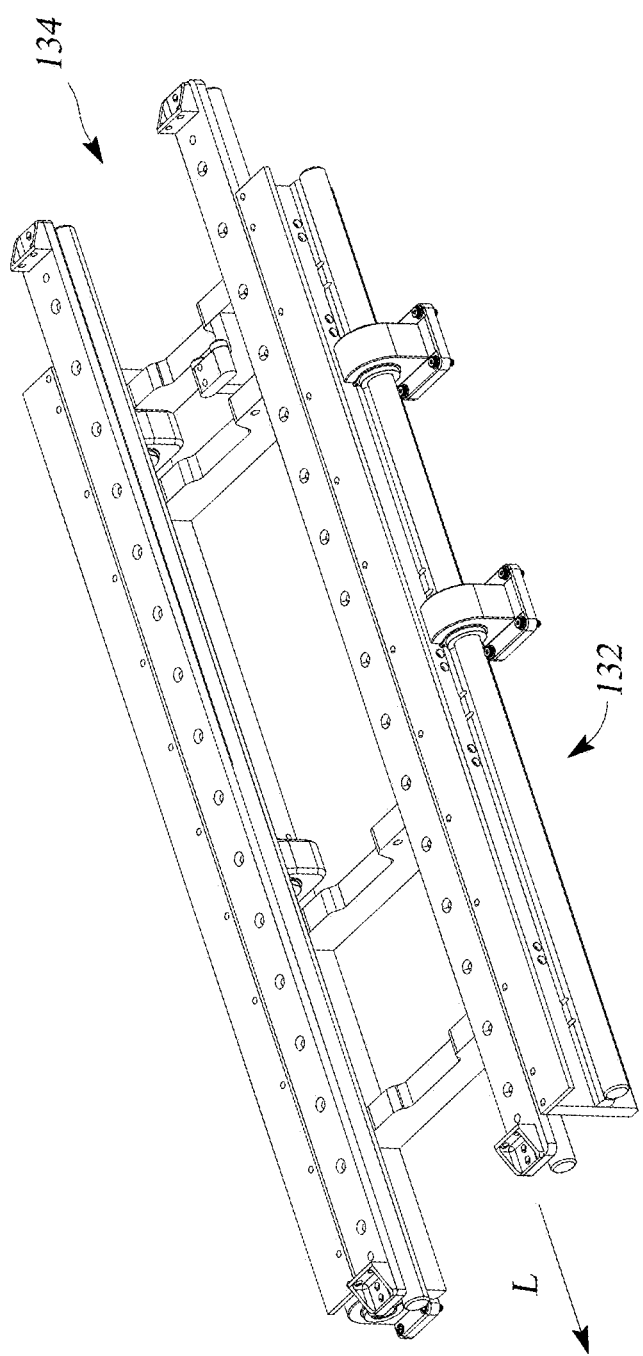
FIG. 16 is another top, front, and right-side perspective view of the guide mechanism of FIG. 14, in corresponding to the retracted position. [Reverse the above mentioned extended and retracted positions.]

With reference to FIGS. 14-16, the front secondary linear guide member 180 is slidably engaged with the front side secondary carriage assemblies 170, 172. The rear secondary linear guide 182 is slidably engaged with the rear side carriage assemblies 174, 176. The secondary carriage assemblies 170, 172, 174, 176 can be an open bore type of carriage member assembly. The secondary carriage assemblies 170, 172, 174, 176, along with the front and rear secondary guiderails 180, 182, form the secondary guide assembly 134.

FIG. 14 illustrates the positioning of the primary and secondary guide assemblies 132, 134 in the deployed position. In this position, in use, the conveyor assembly 104 is supported, in a cantilevered manner, in the proper position aligned with the front roller 24 and orientated for conveying cut dough pieces away from the front roller 24. The primary and secondary guide assemblies 132, 134 are configured to nest or telescope between the deployed and retracted positions. For example, the secondary guide assembly 134 can retract into the primary guide assembly 132 by the action of the front and rear secondary linear guide members 180, 182 sliding along the carriage assemblies 170, 172, 174, 176, to the position illustrated in FIG. 15. Further, the primary guide assembly 132 can also further slide laterally thereby further carrying the secondary guide assembly 134 further in the lateral direction, for example, to the position illustrated in FIG. 16 or even further such as the position illustrated in FIG. 2.

Figure 3:
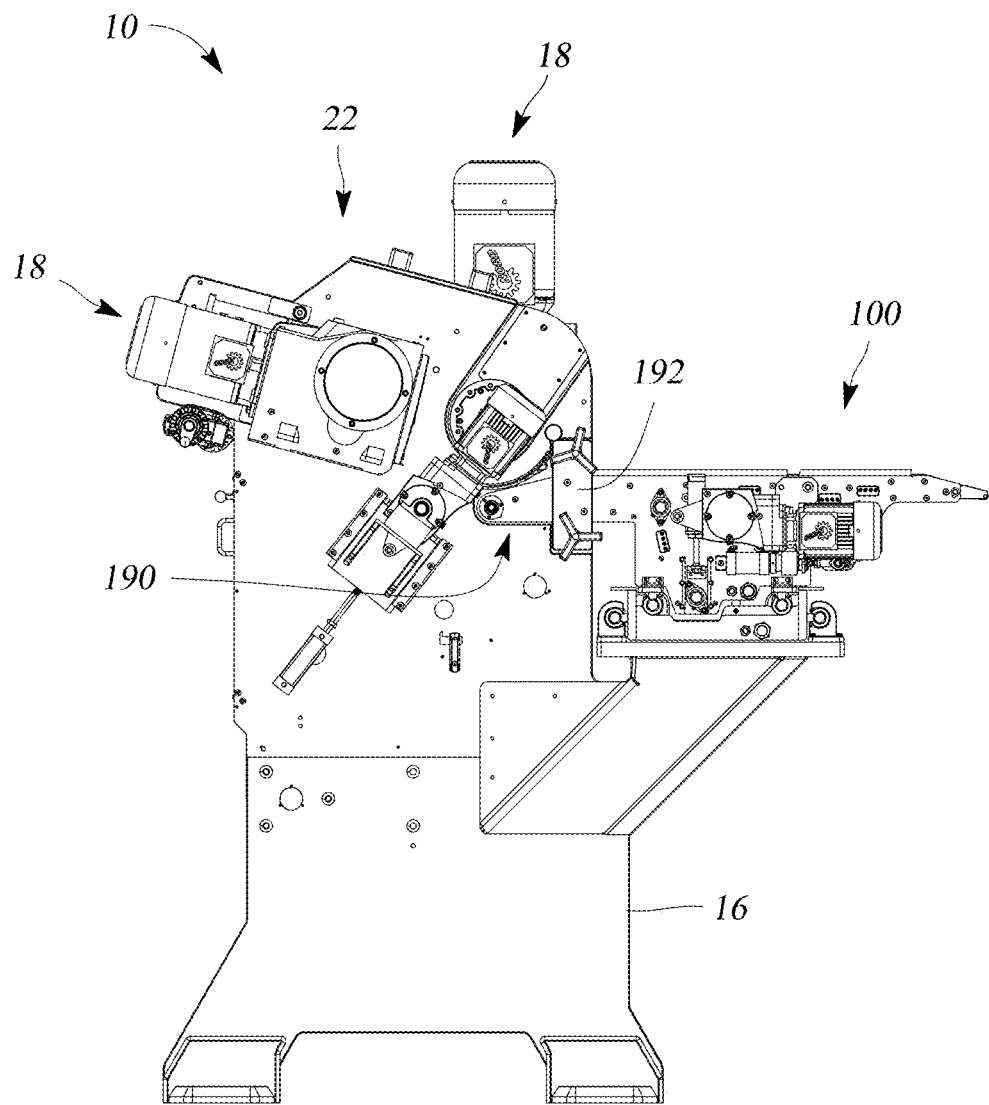
FIG. 3 is a left-side elevational view of the dough sheeter of FIG. 1.

With reference to FIG. 3, optionally, the sheeter 10 can include a blockable side passage 190 formed in a side plate member of the frame 16. The passage 90 can be shaped to allow a portion or all of the intake end 106 of the conveyor assembly 104 to pass therethrough during movement in the lateral direction. Additionally, the sheeter 10 can include a blocking member 192 removably engaged to the frame 16 so as to block the passage 190, selectively. With the blocking member 192 in place, the conveyor assembly 104 cannot be moved out of its deployed position.

Figure 17:
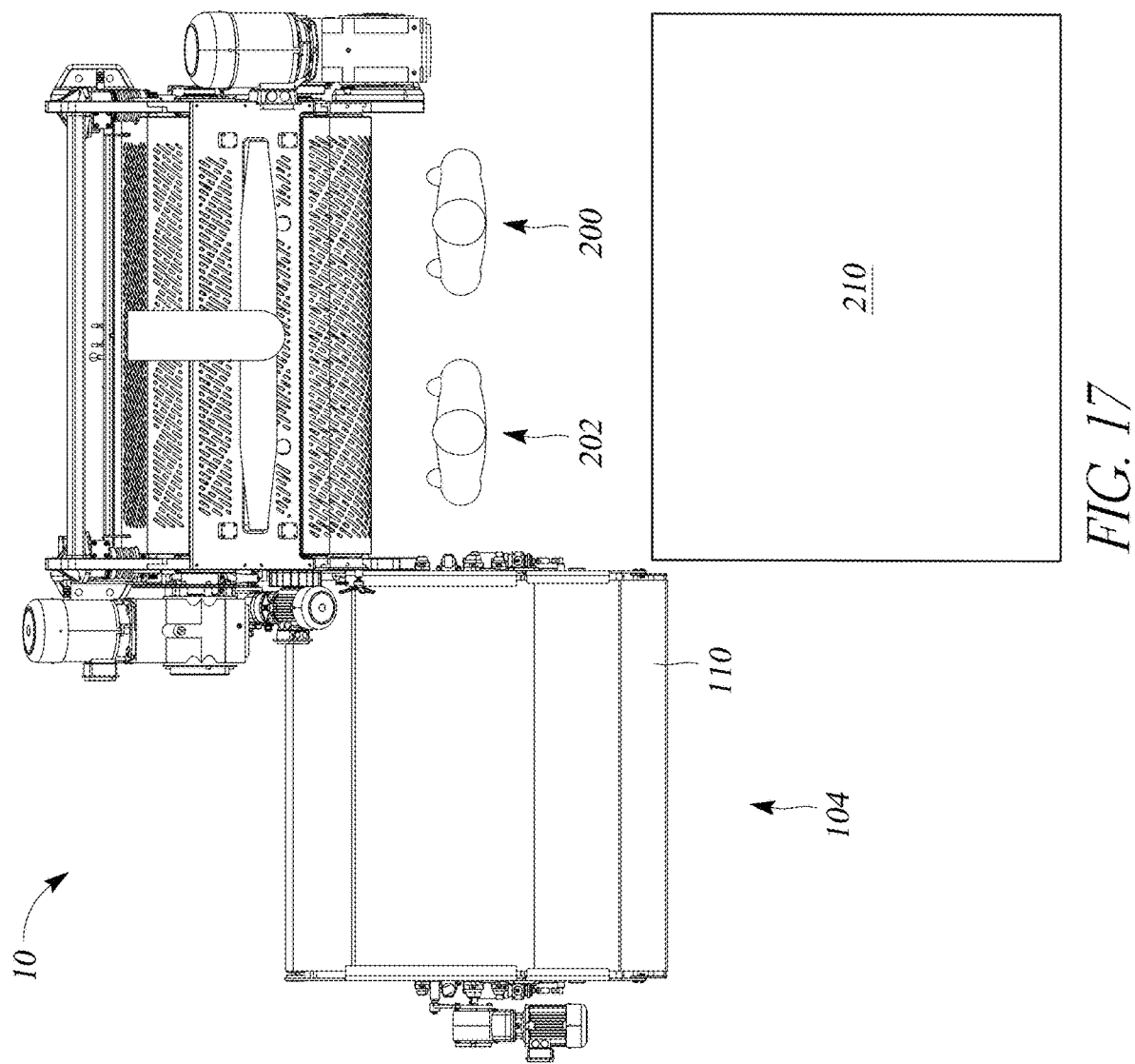
FIG. 17 is a top plan view of the sheeter of FIG. 1, with the discharge conveyor in the retracted position and the schematic of a downstream dough handling device with maintenance workers standing between the sheeter and downstream device.

With reference to FIG. 17, with the conveyor assembly 104 moved to the retracted position, workers 200, 202 can enter a space directly in front of the sheeter 10, to thereby provide easer access to the components of the sheeter 10 for maintenance, for example, but without limitation, repairing or replacing a stripper wire, servicing or inspecting the front roller, cleaning, etc. Users 200, 202 can also access the discharge end 110 of the conveyor assembly because it is also offset from downstream devices when in the retracted position. Additionally, this also provides users 200, 202 with the ability to access areas of a downstream component, for example, an oven feed conveyor device 210.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A dough sheeting device comprising:
   a support frame;
   a rear roller having a first outer surface and supported by the support frame to rotate about a first axis;
   a front roller having a second outer surface and supported by the support frame to rotate about a second axis spaced from the first axis such that juxtaposed portions of the first outer surface and the second outer surface define a pinch point gap;
   a cutter roller having an outer cutting surface and supported by the support frame to rotate about a third axis spaced from the second axis such that the outer cutting surface and the second outer surface are sufficiently close to cut dough;
   a discharge conveyor assembly comprising a conveyor frame, a plurality of rollers supported by the conveyor frame, a drive roller, a drive motor connected to the drive roller and configured to rotate the drive roller, a conveyor belt wrapped around the plurality of rollers and the drive roller, the discharge conveyor assembly having an intake end, a discharge end, and a central portion between the intake end and the discharge end; and
   a guide assembly supporting the discharge conveyor assembly for movement between a deployed position and a retracted position, the guide assembly comprising:
      a base pedestal fixed to the support frame;
      a primary linear guide assembly comprising a plurality of primary carriage assemblies fixed to the base pedestal, first and second primary guide rails slidingly engaged with the plurality of primary carriage assemblies, and a primary guide frame supported by the first and second primary guide rails; and
      a secondary linear guide assembly comprising a plurality of secondary carriage assemblies fixed to the primary guide frame, first and second secondary guide rails slidingly engaged with the plurality of secondary carriage assemblies, the first and second secondary guide rails supporting the discharge conveyor assembly,
      wherein the primary linear guide assembly and the secondary linear guide assembly are configured to nest with each other when in the retracted position so as to support the discharge conveyor assembly in a position fully offset from the front roller and to extend in a telescoping manner when in the deployed position so as to support the discharge conveyor assembly in a position aligned with the front roller.

2. The dough sheeting device according to claim 1, wherein the support frame comprises a first side plate member and a second side plate member, the base pedestal being fixed to the first side plate member, wherein the first side plate member comprises a passage aligned with the intake end of the discharge conveyor assembly such that the intake end passes through the passage when the discharge conveyor assembly moves from the deployed position to the retracted position.

3. The dough sheeting device according to claim 2, additionally comprising a blocking member removably connected to the passage such that the discharge conveyor assembly is blocked from passing through the passage when the blocking member is connected to the passage.

4. The dough sheeting device according to claim 2, wherein the guide assembly is configured to support the discharge conveyor assembly in a position fully offset from the first side plate member when in the retracted position.

5. The dough sheeting device according to claim 1, additionally comprising a stripper wire assembly, comprising a first stripper wire mount disposed adjacent a first end of the front roller, a second stripper wire mount disposed at a second end of the front roller, and a stripper wire connected to the first stripper wire mount and the second stripper wire mount with sufficient tension to maintain the stripper wire in contact with the first outer surface.

6. A dough sheeting device comprising:
a support frame;
a rear roller having a first outer surface and supported by the support frame to rotate about a first axis;
a front roller having a second outer surface and supported by the support frame to rotate about a second axis spaced from the first axis such that juxtaposed portions of the first outer surface and the second outer surface define a pinch point gap;
a cutter roller having an outer cutting surface and supported by the support frame to rotate about a third axis spaced from the second axis such that the outer cutting surface and the second outer surface are sufficiently close to cut dough;
a discharge conveyor assembly comprising a conveyor frame, a plurality of rollers supported by the conveyor frame, a conveyor belt wrapped around the plurality of rollers, the discharge conveyor assembly having an intake end, a discharge end, and a central portion between the intake end and the discharge end; and
a guide assembly supporting the discharge conveyor assembly for movement between a deployed position and a retracted position, the guide assembly comprising:
a base fixed to the support frame;
a primary linear guide assembly supported on the base and configured to slide laterally relative to the support frame; and
a secondary linear guide assembly supported on and configured to slide laterally relative to the primary linear guide assembly, the discharge conveyor assembly being supported on the secondary linear guide assembly,
wherein the primary linear guide assembly and the secondary linear guide assembly are configured to nest with each other when in the retracted position so as to support the discharge conveyor assembly in a position fully offset from the front roller and to extend in a telescoping manner when in the deployed position so as to support the discharge conveyor assembly in a position aligned with the front roller.

7. The dough sheeting device according to claim 6, wherein the support frame comprises a first side plate member and a second side plate member, the base being fixed to the first side plate member, wherein the first side plate member comprises a passage aligned with the intake end of the discharge conveyor assembly such that the intake end passes through the passage when the discharge conveyor assembly moves from the deployed position to the retracted position.

8. The dough sheeting device according to claim 7, additionally comprising a blocking member removably connected to the passage such that the discharge conveyor assembly is blocked from passing through the passage when the blocking member is connected to the passage.

9. The dough sheeting device according to claim 7, wherein the guide assembly is configured to support the discharge conveyor assembly in a position fully offset from the first side plate member when in the retracted position.

10. The dough sheeting device according to claim 6, additionally comprising a stripper wire assembly, comprising a first stripper wire mount disposed adjacent a first end of the front roller, a second stripper wire mount disposed at a second end of the front roller, and a stripper wire connected to the first stripper wire mount and the second stripper wire mount with sufficient tension to maintain the stripper wire in contact with the first outer surface.

11. The dough sheeting device according to claim 6, wherein the discharge conveyor assembly further comprises a drive roller, and a drive motor connected to the drive roller and configured to rotate the drive roller.

12. The dough sheeting device according to claim 6, wherein the primary linear guide assembly comprises a plurality of primary carriage assemblies fixed to the base, first and second primary guide rails slidingly engaged with the plurality of primary carriage assemblies, and a primary guide frame supported by the first and second primary guide rails.

13. The dough sheeting device according to claim 12, wherein the secondary linear guide assembly comprises a plurality of secondary carriage assemblies fixed to the primary guide frame, first and second secondary guide rails slidingly engaged with the plurality of secondary carriage assemblies, the first and second secondary guide rails supporting the discharge conveyor assembly.

14. A dough sheeting device comprising:
a support frame;
a discharge conveyor assembly comprising a conveyor frame and a conveyor belt, the discharge conveyor assembly having an intake end, a discharge end, and a central portion between the intake end and the discharge end; and
a guide assembly supporting the discharge conveyor assembly for movement between a deployed position aligned with the support frame and a retracted position laterally offset from the deployed position.

15. The dough sheeting device according to claim 14, wherein the support frame comprises a first side plate member and a second side plate member, a base of the guide assembly being fixed to the first side plate member, wherein the first side plate member comprises a passage aligned with the intake end of the discharge conveyor assembly such that the intake end passes through the passage when the discharge conveyor assembly moves from the deployed position to the retracted position.

16. The dough sheeting device according to claim 15, additionally comprising a blocking member removably connected to the passage such that the discharge conveyor assembly is blocked from passing through the passage when the blocking member is connected to the passage.

17. The dough sheeting device according to claim 15, wherein the guide assembly is configured to support the discharge conveyor assembly in a position fully offset from the first side plate member when in the retracted position.

18. The dough sheeting device according to claim 14, additionally comprising a rear roller having a first outer surface and supported by the support frame to rotate about a first axis, a front roller having a second outer surface and supported by the support frame to rotate about a second axis spaced from the first axis such that juxtaposed portions of the first outer surface and the second outer surface define a pinch point gap, and a cutter roller having an outer cutting surface and supported by the support frame to rotate about a third axis spaced from the second axis such that the outer cutting surface and the second outer surface are sufficiently close to cut dough.

19. The dough sheeting device according to claim 14, wherein the discharge conveyor assembly further comprises a drive roller, and a drive motor connected to the drive roller and configured to rotate the drive roller.

20. The dough sheeting device according to claim 14, wherein the guide assembly comprises a base fixed to the support frame, a primary linear guide assembly supported on the base and configured to slide laterally relative to the support frame, and a secondary linear guide assembly supported on and configured to slide laterally relative to the primary linear guide assembly, wherein the discharge conveyor assembly is supported on the secondary linear guide assembly.

21. The dough sheeting device according to claim 20, wherein the primary linear guide assembly comprises a plurality of primary carriage assemblies fixed to the base, first and second primary guide rails slidingly engaged with the plurality of primary carriage assemblies, and a primary guide frame supported by the first and second primary guide rails.

22. The dough sheeting device according to claim 21, wherein the secondary linear guide assembly comprises a plurality of secondary carriage assemblies fixed to the primary guide frame, first and second secondary guide rails slidingly engaged with the plurality of secondary carriage assemblies, the first and second secondary guide rails supporting the discharge conveyor assembly.

23. The dough sheeting device according to claim 21, wherein the primary linear guide assembly and the secondary linear guide assembly are configured to nest with each other when in the retracted position and to extend in a telescoping manner when in the deployed position.

24. The dough sheeting device according to claim 18, additionally comprising a stripper wire assembly, comprising a first stripper wire mount disposed adjacent a first end of the front roller, a second stripper wire mount disposed at a second end of the front roller, and a stripper wire connected to the first stripper wire mount and the second stripper wire mount with sufficient tension to maintain the stripper wire in contact with the first outer surface.

25. The dough sheeting device according to claim 14, wherein the discharge conveyor assembly additionally comprises a plurality of rollers supported by the conveyor frame, a drive roller, a drive motor connected to the drive roller, the conveyor belt wrapped around the plurality of rollers and the drive roller.

* * * * *